United States Patent Office 3,230,237
Patented Jan. 18, 1966

3,230,237
PREPARATION OF BENZOFURANS BY REACTION OF PHENOLS AND 1,1-DIHALO CYCLO PROPANES
Gene C. Robinson, Baton Rouge, La., assignor to Ethyl Corporation, New York, N.Y., a corporation of Virginia
No Drawing. Filed Dec. 23, 1963, Ser. No. 332,920
14 Claims. (Cl. 260—346.2)

This invention relates to and has as its chief object the provision of a novel process for the preparation of furans. More particularly, this invention relates to a process whereby benzofurans are produced economically by a unique method.

By the term "benzofuran" it is meant one of a group of organic heterocyclic compounds in which a benzene ring is fused to the 5-atom furan ring according to the following formula:

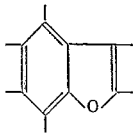

Exemplary of current methods for producing benzofurans is the procedure described in Ann., 342, 11 (1905). According to this procedure cis-beta-bromo-ortho-hydroxy styrene is reacted with potassium hydroxide to produce benzofuran.

The objects of this invention are accomplished by contacting (i.e. effecting a reaction between) a phenol and a gem-dihalocyclopropane.

The term gem-dihalocyclopropane refers to a group of compounds containing in the molecule the following structure wherein X is a halogen:

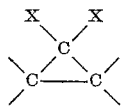

The gem-dihalocyclopropane reagents of this invention are further characterized in that they contain at least one hydrogen substituent on the cyclopropane ring, not more than one additional ring fused to the cyclopropane ring, from 3 to about 20 carbon atoms in the ring system and from 3 to about 60 carbon atoms in the total molecule. The gem-dihalocyclopropane reagents containing only the cyclopropane ring in the ring system are conveniently referred to as 1,1-dihalocyclopropanes and those having an additional ring fused to the cyclopropane ring are conveniently referred to as n,n-dihalobicyclo(n-3,1,0)-hydrocarbon compounds. This reagent is described hereinafter.

The n,n - dihalobicyclo(n - 3,1,0) - hydrocarbon compounds hereinafter referred to as the bicyclo reagent, is characterized in that it contains a cyclopropane ring to which is fused another cyclic hydrocarbon ring. The total number of carbon atoms in the fused ring system —i.e. the number of carbon atoms in the ring of the bivalent moiety which is attached to two points on the cyclopropane ring plus the three carbon atoms of the cyclopropane ring—ranges from 4 to about 20. The bicyclo reagent is further characterized in that the total molecule contains from 4 to about 60 carbon atoms and preferably from about 5 to about 30 carbon atoms. Therefore the simplest bicyclo reagent containing 4 carbon atoms in the fused ring system and a total of 4 carbon atoms in the molecule is 4,4-dihalobicyclo(1,1,0)-butane having the formula:

(I) 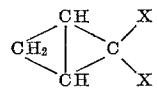

wherein X is a halogen. An example of a bicyclo reagent containing 20 carbon atoms in the fused ring system and a total of 20 carbon atoms in the molecule is 20,20-dihalobicyclo(17,1,0)-eicosane having the formula:

(II) 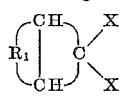

wherein X is hereinabove defined and wherein $R_1$ is an alkylene group having 17 carbon atoms. By the same token a bicyclo reagent having 7 carbon atoms in the fused ring system and having a total of 27 carbon atoms in the total molecule is 7,7 - dihalobicyclo - (4,1,0) -2,5-deccylheptane having the following formula:

(III) 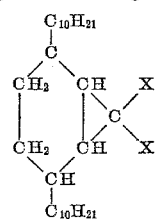

wherein X is as defined above.

Accordingly the bicyclo reagent of the present process can be generally depicted by the formula:

(IV) 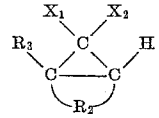

wherein $X_1$ and $X_2$ are halogens and may be the same or different; wherein $R_2$ is a bivalent hydrocarbon group characterized by being from 1 to about 17 carbon atoms in length; by containing a total of from 1 to about 50 carbon atoms in the substituents, if present thereon (such substituents being selected from the group consisting of alkyl, cycloalkyl, aryl, aralkyl, cycloalkenyl, and aralkenyl), such substituents individually containing 1 to about 20 carbon atoms and most preferaby 1–10 carbon atoms; by being composed of a chain of saturated carbon atoms(s) or a chain of olefinically unsaturated carbon atoms either of which may be substituted by one or more of (a) said hydrocarbon substituents and/or functional groups selected from the group consisting of hydroxyl, amino, halides, carbonyl, functionally substituted hydrocarbon groups which themselves contain such functional groups, alkoxy, cycloalkoxy, aryloxy, alkenoxy, cycloalkenoxy, aryloxy, and aralkenoxy groups (the foregoing hydrocarboxy groups may themselves be substituted with any of said functional groups); and by containing in the above described bivalent hydrocarbon group from 0 to about 4 (i.e. up to about 4) divalent groups taken from the following:

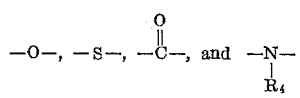

wherein $R_4$ is either hydrogen or a hydrocarbon group containing from 1 to about 24 carbon atoms. Thus when the chain is a saturated chain it is an alkylene group which may or may not be interrupted at one or more portions thereof by one or more of the isolated divalent groups depicted and described above. On the other hand when the chain is an olefinically unsaturated chain it will generally contain from 1 to about 4 isolated ethylenic double bonds and in addition, this chain may likewise be so interrupted. Generally speaking, $R_2$ is preferably a bivalent hydrocarbon group composed solely of carbon and hydrogen atoms. $R_3$ is hydrogen or the substituents hereinabove described for the group $R_2$.

The 1,1-dihalocyclopropane reagent of this process is a 1,1-dihalocyclopropane wherein the carbon atom in the 1 position is a monocyclic carbon atom. In other words, the carbon atom in the cyclopropane ring containing the 2 halogen atoms must only be a member of one ring, that is, said carbon atom is a member of a non-fused ring system. It is, of course, understood that another carbon atom in the cyclopropane ring may be members of a ring, that is, spiro-compounds are to be included as reagents in this invention the only requirement being that one of the other carbon atoms is hydrogen substituted.

The 1,1-dihalocyclopropane is further defined by the following formula:

(V)

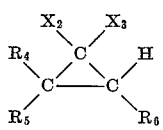

wherein $X_2$ and $X_3$ are halogens and may be the same or different and each R is hydrogen, an inorganic radical or an organic radical having from 1 to about 20 carbon atoms and preferably 1–10 carbon atoms. This reagent is further characterized in that the total molecule contains from 3 to about 60 carbon atoms and preferably from 3 to about 30 carbon atoms. A wide variety of inorganic radicals can be employed, for instance, halides, amino groups, hydroxyl groups, and the like. Preferably $R_4$, $R_5$ and $R_6$ are each selected from the group consisting of hydrogen, alkyl, cycloalkyl, alkenyl, cycloalkenyl, aryl, aralkyl, aralkenyl, alkoxy, cycloalkoxy, alkynoxy, aryloxy, aralkoxy and aralkynoxy radicals. The aforesaid hydrocarbon and hydrocarboxy radicals may contain substituents such as halogens, hydroxy groups, amino groups and the like, and further said hydrocarbon and said hydrocarboxy radicals may contain up to about 4 divalent functional groups in the carbon chain selected from the groups consisting of

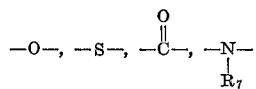

wherein $R_7$ is hydrogen or a hydrocarbon radical having from 1 to 20 carbon atoms.

Any of a wide variety of phenols may be utilized in the process of this invention. The only requirement being that the phenol contain at least one hydrogen substituent on the aromatic nucleus ortho to the hydroxy group. The phenol may be mono- or polynuclear an may contain any of a wide variety of substituents. Preferably the phenol is a monohydroxyphenol containing not more than two fused benzene rings in the aromatic nucleus (that is, from 6 to 12 nuclear carbon atoms) and from 6 to about 40 carbon atoms in the total molecule. The preferred phenol reagent is depicted by the following structural formula:

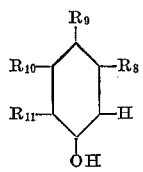

wherein each R is hydrogen, an inorganic radical such as a halide, or an inorganic radical having from 1 to about 20 carbon atoms and preferably from 1 to 10 carbon atoms. Preferably $R_8$, $R_9$, $R_{10}$, and $R_{11}$ are each selected from the group consisting of hydrogen, alkyl, cycloalkyl, alkenyl, cycloalkenyl, aryl, aralkyl, aralkenyl, alkoxy, cycloalkoxy, alkynoxy, aryloxy, aralkenoxy, and aralkynoxy radicals. Preferably each R is selected from the group consisting of hydrogen and alkyl groups having 1–10 carbon atoms.

The process is to be conducted at temperatures which are sufficient to produce the desired furan product but insufficient to decompose the product. These results are achieved by conducting the process at a temperature within the range of from about 20° C. to about 300° C. and preferably from about 150° C. to about 300° C. Of course, the preferred or optimum temperature varies between these ranges depending upon the specific reagents employed.

Generally speaking the process is conducted at autogenous pressures in a closed reaction vessel or at atmospheric pressure in a vessel equipped with a reflux condenser due to the fact that the preferred reaction temperatures are above the boiling point of the reagents (the process of this invention is preferably conducted in the liquid phase). The pressures will vary between 0 and 2000 p.s.i.g. depending on the boiling points of the reagents employed. The reaction pressure may be reduced substantially according to another preferred embodiment, i.e. dissolving the reagents in a high boiling organic solvent which is inert to the reagents and product. This solvent should have a boiling point of between about 150° C. and 300° C. and preferably between 175° C. and 250° C. The solvent is generally employed in a molar excess, based on the gem-dihalocyclopropane of about 10 to about 400 mole percent. Preferred solvents are hydrocarbons and ethers having 5–20 carbon atoms.

The reagents are generally employed in stoichiometric proportions due to economic considerations, i.e. 1 mole of phenol to 1 mole of gem-dihalocyclopropane. The proportions can however range from 10:1 to 1:10 moles of phenol per mole of gem-dihalocyclopropane. Because the phenol reagent is generally more readily available it is often preferred to employ it in an excess of from about 50–350 mole percent to insure efficient consumption of the gem-dihalocyclopropane reagent. Excellent results are achieved when the molar ratio of phenol to gem-dihalocyclopropane is at least about 3:1.

In order to insure high yields it is preferred though not required to add a basic metal compound to the reaction mixture. These compounds are preferably selected from the group consisting of alkali metal oxides, alkali metal hydroxides, alkaline earth metal oxides, and alkaline earth metal hydroxides. Other suitable compounds are the alkali and alkaline earth carbonates, bicarbonates, phosphates, borates and cyanides. These compounds are employed in a molar ratio (metal compound: gem-dihalocyclopropane) of 0.1:1 to 5:1 and preferably about 3:1.

In order that those skilled in the art may better understand the process of this invention the following working examples are given by way of description and not by way of limitation.

EXAMPLE I

Into a reaction vessel was charged 16.7 parts of 1,1-dichloro-2-n-butyl cyclopropane and 100 parts phenol. The reaction mixture was heated to a temperature of 180° C. The reaction continued for 3 hours. 60 percent of 2-methyl-3-n-butyl benzofuran was recovered.

EXAMPLE II

Into a reaction vessel was charged 33 parts of 7,7-dichloro-bicyclo(4,1,0)-heptane and 220 parts of phenol. The reaction mixture was heated to a temperature of 220° C. The reaction was allowed to continue for approximately 2 hours. 70 percent of 2,3-pentamethyleno-benzofuran was recovered.

EXAMPLE III 30 parts of 1,1-dichloro-2-phenylcyclopropane and 200 parts of phenol were charged into a reaction vessel. The reaction mixture was heated to a temperature of about 180° C. The reaction proceeded for approximately 5 hours. A 74 percent yield of 2-phenyl-3-methylbenzofuran was recovered.

In the following examples (IV–XII) a procedure similar to Example I is employed except as otherwise indicated.

Preferred are 1,1-dichloro-2-dimethoxymethylcyclopropane,
4-(2,2-dichlorocyclopropyl) hydantoin,
1,1-dichloro-2-methylcyclopropane and
1,1-dichlorocyclopropane.

The gem-dihalocyclopropane reagent of this invention may be prepared according to any of the procedures described in the art. For instance, 1,1-dichloro-2-methylcyclopropane is produced by first reacting metallic potas-

Table

[All runs conducted in a sealed vessel at ambient pressure. Molar ratio of phenol:gem-dihalocyclopropane about 3:1 in all runs]

| Example | Gem-dihalocyclopropane | Phenol | Temp., °C. | Product |
|---------|------------------------|--------|-----------|---------|
| IV  | 1,1-dichloro-2-methoxymethylcyclopropane | Phenol | 185 | 1-methoxy-2-(3-benzafuramyl)-ethane. |
| V   | 1,1-dichloro-2,2,3-trimethylcyclopropane | do | 180 | 2-methyl-3-isopropylbenzofuran. |
| VI  | 1-methyl-6,6-dichlorobicyclo(3,1,0)hexane | Cresol | 200 | 1,8-dimethyl-1,2,3,4-tetrahydrodibenzofuran. |
| VII | 7,7-dichlorobicyclo(4,1,0)heptane | Guaricol | 173 | 7-methoxy-2,3-pentamethylenobenzofuran. |
| VIII| 6,6-dibromobicyclo(3,1,0)hexane | 3-allylphenol | 245 | 2,3-tetramethyleno-6-allylbenzofuran. |
| IX  | 7-chloro-7-fluorobicyclo(4,1,0)heptane | p-Iodophenol | 165 | 2,3-pentamethyleno-6-iodobenzofuran. |
| X   | 1,1-dichloro-2-phenylcyclopropane [1] | α-Naphthol | 170 | 2-phenyl-3-methyl-6,7-benzofuran. |
| XI  | 7-chloro-7-bromobicyclo(4,1,0)heptane [2] | Phenol | 150 | 2,3-pentamethylenobenzofuran. |
| XII | 6,6-dichlorobicyclo(3,1,0)hexane [3] | 3-n-decyl-4-phenylphenol. | 301 | 2,3-tetramethyleno-5-phenyl-6-n-decylbenzofuran. |

[1] Sodium hydroxide flakes added to reaction mixture.
[2] Cyclohexane employed as solvent.
[3] Calcium oxide pellets added and diethylene glycol dimethyl ether added as solvent.

Exemplary of specific bicyclo reagents which may be employed in this process are:

7-fluoro-7-chlorobicyclo(4,1,0)–heptane,
7-bromo-7-iodobicyclo(4,1,0)–heptane,
7-chloro-7-bromo-2,5-diethylbicyclo(4,1,0)-heptane,
7,7,-diiodobicyclo(4,1,0)-hexene-3,7,7,-dibromo-5-phenylbicyclo(4,1,0)-heptane,
7,7-difluoro-6-eicosyl-3-ethoxybicyclo(4,1,0)-heptane,
7,7-dichloro-3-phenoxy-4-pentyl-bicyclo(4,1,0)-heptane,
7,7-dichloro-1-tolyl-6-pentyl-bicyclo(4,1,0)hexadiene-2,4, and the like.

Other bicyclo reagents are:

6,6-dichlorobicyclo(3,1,0)-hexane,
6,6-dibromo-1-isobutylbicyclo(3,1,0)-hexane-2,
9,9-difluoro-2-methyl-4-octyl-6-phenoxy-bicyclo(6,1,0)-nonane,
9,9-dichlorobicyclo(6,1,0)-nonene-4,
7,7,-dichloro-2-oxybicyclo(4,1,0)-heptane,
13,13-dichloro-bicyclo(10,1,0)-tridecadiene-3,7,
20,20-dichlorobicyclo(17,1,0)-eicosane, and the like.

Preferred bicyclo reagents are 6,6-dichlorobicyclo(3,1,0)-hexane and
7,7-dichlorobicyclo(4,1,0)-heptane.

Exemplary of the 1,1-dihalocyclopropane reagents of this invention are 1,1-dichloro-2-n-propyl-cyclopropane,
1,1-dichloro-2,2-dimethyl-cyclopropane,
1,1-dichloro-2,2,3-trimethyl-cyclopropane,
1,1-dichloro-2-phenyl-cyclopropane,
1,1-dibromo-2-methylcyclopropane,
1,1-difluoro-2-methyl-cyclopropane,
1-fluoro-1-bromocyclopropane,
1,1-dibromo-2,3-diphenyl-cyclopropane,
1,1-dichloro-2-propyl-3-tolylcyclopropane,
1,1-difluoro-2-pentyl-3-naphthylcyclopropane,
1,1-dichloro-2-phenl-3-cyclohexyl-cyclopropane,
1,1-dichloro-2-methyl-3-cyclopropyl-cyclopropane,
1,1-dichloro-2-methyl-3-ethenyl-cyclopropane,
1,1-difluoro-2-phenyl-3-ethenylcyclopropane,
1,1-dihalo-2-butenyl-3-isopropyl-cyclopropane,
1,1-dihalo-2-methyl-3-propenyl-cyclopropane,
1,4-dibromo-2-isopropyl-3,3-trimethylene-cyclopropane,
1,1-dichloro-2,2-dimethoxy-cyclopropane,
1,1-dichloro-2,3-didecyl-cyclopropane,
1,1-dibromo-2-dodecyl-2-methyl-3-octadecyl-3-phenylcyclopropane and the like.

sium and tertiary butyl alcohol followed by the reaction of the metal alcoholate so produced with chloroform in the presence of propylene. Another procedure comprises reacting potassium hydroxide and chloroform in the presence of an olefin. For further discussion see "The Addition of Dihalocarbene to Olefins" by Doering and Hoffman, J. of Am. Chem. Soc., 76, 6162, (1954).

Exemplary of the metal compounds are sodium oxide, lithium oxide, potassium oxide, rubidium oxide, cesium oxide, beryllium oxide, magnesium oxide, calcium oxide, strontium oxide, barium oxide, sodium hydroxide, lithium hydroxide, potassium hydroxide, rubidium hydroxide, cesium hydroxide, beryllium hydroxide, magnesium hydroxide, calcium hydroxide, strontium hydroxide, barium hydroxide, sodium carbonate, lithium carbonate, potassium carbonate, rubidium carbonate, cesium carbonate, beryllium carbonate, magnesium carbonate, calcium carbonate, sodium bicarbonate, potassium bicarbonate, lithium phosphate, sodium phosphate, potassium phosphate, beryllium phosphate, magnesium phosphate, calcium phosphate, sodium borate, potassium borate, beryllium borate, magnesium borate, calcium borate, sodium cyanide, postasium cyanide, magnesium cyanide, calcium cyanide, and the like. Preferred are sodium oxide, sodium hydroxide, calcium oxide and calcium hydroxide.

Exemplary of the phenols (or phenolic compounds) are: p-methoxyphenol, p-isopropylphenol, meta-chloro-phenol, 3-methyl-4-chloro-5-methoxyphenol, p-phenylphenol, 3,5-dimethoxyphenyl, p-n-decylphenol, p-isooctylphenol, 3,4-dichlorophenol, p-aminothiophenol, o-ethylaminophenol, p,p'-methylenediphenol, and the like.

The furans produced according to this invention have utility recognized by the art. For instance, benzofuran is used to prepare coumarone-indene resins. These resins are obtained by heating mixtures of benzofuran and indene with sulfuric acid so as to cause polymerization to thermal plastic materials. These resins are employed as components in aluminum paint, concrete curing compounds, and adhesives.

Having described the invention what I claim as new and desire to secure by Letters Patent of the United States is as follows:

I claim:

1. A process for the production of furans comprising contacting a phenolic compound and a gem-dihalocyclopropane at a temperature of from about 20° C. to about 300° C.; said phenolic compound containing from 6 to 12 nuclear carbon atoms, from 6 to about 40 carbon atoms in the total molecule, and at least 1 hydrogen substituent on the aromatic nucleus ortho to the hydroxy group, said gem-dihalocyclopropane containing not more than 1 additional ring fused to the cyclopropane ring, from 3 to about 60 carbon atoms in the total molecule, and at least 1 hydrogen substituent on the cyclopropane ring.

2. The process of claim 1 wherein said gem-dihalocyclopropane is a a 1,1-dihalocyclopropane.

3. The process of claim 1 wherein said gem-dihalocyclopropane is a n,n-dihalobicyclo(n-3,1,0)-hydrocarbon compound.

4. The process of claim 1 wherein said phenolic compound is monohydroxy phenolic compound.

5. The process of claim 1 conducted at a temperature of about 150° C. to about 300° C.

6. The process of claim 1 wherein a basic metal compound is added to the reaction mixture, said basic metal compound being selected from the group consisting of alkali and alkaline earth metal oxides and hydroxides.

7. The process of claim 1 conducted in an organic solvent having a boiling point between about 150° C. and 300° C.

8. The process of claim 1 wherein said phenolic compound is phenol.

9. The process of claim 1 wherein said gem-dihalocyclopropane is 1,1-dichloro-2-n-butylcyclopropane.

10. The process of claim 1 wherein said gem-dihalocyclopropane is 7,7-dichloro-bicyclo(4,1,0)-heptane.

11. The process of claim 1 wherein said gem-dihalocyclopropane is 1,1-dichloro-2-phenylcyclopropane.

12. A process for producing 2-methyl-3-n-butylbenzofuran which comprises reacting 1,1-dichloro-2-n-butylcyclopropane with phenol in the liquid phase at a temperature of from about 150° C. to about 300° C.

13. A process for producing 2,3-pentamethylenobenzofuran which comprises reacting 7,7-dichloro-bicyclo(4,1,0)-heptane with phenol in the liquid phase at a temperature of from about 150° C. to about 300° C.

14. A process for producing 2-phenyl-3-methylbenzofuran which comprises reacting 1,1-dichloro-2-phenylcyclopropane with phenol in the liquid phase at a temperature of from about 150° C. to about 300° C.

No references cited.

NICHOLAS S. RIZZO, *Primary Examiner.*